United States Patent
Büttner et al.

(10) Patent No.: US 9,252,642 B2
(45) Date of Patent: Feb. 2, 2016

(54) ELECTRICAL MACHINE (75) Inventors: Klaus Büttner, Hollstadt (DE);
Vladimir Danov, Erlangen (DE); Olaf Rehme, Hamburg (DE); Martin Schäfer, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 4 days.

(21) Appl. No.: 13/504,746

(22) PCT Filed: Oct. 22, 2010

(86) PCT No.: PCT/EP2010/065966
§ 371 (c)(1),
(2), (4) Date: Apr. 27, 2012

(87) PCT Pub. No.: WO2011/051183
PCT Pub. Date: May 5, 2011

(65) Prior Publication Data
US 2012/0205996 A1    Aug. 16, 2012

(30) Foreign Application Priority Data
Oct. 28, 2009   (DE) .................. 10 2009 051 114

(51) Int. Cl.
*H02K 9/20*     (2006.01)
(52) U.S. Cl.
CPC ........................................ *H02K 9/20* (2013.01)
(58) Field of Classification Search
USPC .......................... 310/60 A, 61, 54, 57, 58, 64
See application file for complete search history.

(56) References Cited

U.S. PATENT DOCUMENTS

| | | | | |
|---|---|---|---|---|
| 2,330,121 A * | 9/1943 | Heintz | ............................ | 310/52 |
| 2,706,260 A * | 4/1955 | Heintz | ............................ | 310/54 |
| 3,842,596 A * | 10/1974 | Gray | ................................ | 60/736 |
| 5,319,272 A * | 6/1994 | Raad | ........................... | 310/68 D |
| 5,394,040 A * | 2/1995 | Khanh | ........................... | 310/64 |
| 5,837,960 A | 11/1998 | Barbe | | |
| 6,109,897 A * | 8/2000 | Haga | ........................... | 418/55.1 |
| 6,191,511 B1 * | 2/2001 | Zysset | ........................ | 310/60 A |
| 7,049,717 B2 | 5/2006 | Frank et al. | | |
| 7,156,195 B2 * | 1/2007 | Yamagishi et al. | .......... | 180/65.1 |
| 7,489,057 B2 * | 2/2009 | Zhou et al. | ....................... | 310/61 |
| 2005/0088048 A1 * | 4/2005 | Frank et al. | ..................... | 310/61 |
| 2006/0017335 A1 * | 1/2006 | Matin et al. | ..................... | 310/57 |
| 2008/0272661 A1 | 11/2008 | Augenbergs | | |
| 2008/0290215 A1 * | 11/2008 | Udall et al. | .............. | 244/123.14 |

FOREIGN PATENT DOCUMENTS

CN   1989679 A    6/2007
DE   10336277 A1  3/2005

(Continued)

*Primary Examiner* — Naishadh Desai
(74) *Attorney, Agent, or Firm* — Henry M. Feiereisen LLC (57) ABSTRACT

The invention relates to an electric machine (100) comprising a stator (107) and a rotor (101), wherein the rotor (101) comprises a hollow shaft (102), wherein a closed hollow space (103) is formed by means of the hollow shaft (102), wherein the closed hollow space (103) is provided for receiving a cooling agent, wherein a three-dimensional transport structure (200) is provided in the closed hollow chamber (103) for transporting the cooling agent. The three-dimensional structure can, for example, be produced by means of applying an adaptive material.

17 Claims, 5 Drawing Sheets

(56) References Cited

FOREIGN PATENT DOCUMENTS

| | | |
|---|---|---|
| DE | 102007043656 A1 | 5/2009 |
| EP | 0079985 A1 | 6/1983 |
| EP | 0989 658 A1 | 3/2000 |
| EP | 2187507 A1 | 5/2010 |
| GB | 1283332 A | 7/1972 |
| JP | 59158988 A | 9/1984 |
| JP | H08243878 A | 9/1996 |
| SU | 678599 A1 | 5/1979 |
| SU | 1492420 A1 | 7/1989 |

* cited by examiner

ELECTRICAL MACHINE

CROSS-REFERENCES TO RELATED APPLICATIONS

This application is the U.S. National Stage of International Application No. PCT/EP2010/065966, filed Oct. 22, 2010, which designated the United States and has been published as International Publication No. WO 2011/051183 A1 and which claims the priority of German Patent Application, Serial No. 10 2009 051 114.8, filed Oct. 28, 2009, pursuant to 35 U.S.C. 119(a)-(d).

BACKGROUND OF THE INVENTION

The invention relates to an electrical machine. A rotor and/or a stator of the electrical machine, for example an asynchronous machine or a synchronous machine, require cooling. Electrical machines are typically cooled with an airstream. For example, a fan impeller for producing a cooling airstream is located on the shaft of a machine. The cooling airstream is directed to cooling fins provided on the housing of the machine. In one embodiment of the electrical machine a coolant is provided for the cooling of said machine. An example of such an electrical machine is known from DE 10 2007 043 656 A1.

SUMMARY OF THE INVENTION

An object of the present invention is to improve the cooling of the electrical machine.

According to one aspect of the present invention, the object is achieved for example by an electrical machine which has a stator and a rotor, it being possible for the rotor to have a hollow shaft, it being possible for a closed hollow space to be formed by means of the hollow shaft, it being possible for the closed hollow space to be provided to accept a coolant, it being possible for a three-dimensional transport structure to be provided in the closed hollow space to transport the coolant.

According to another aspect of the present invention, the object is achieved for example by a method for the manufacture of a three-dimensional transport structure to transport a coolant of a thermosiphon of an electrical machine, it being possible for an additive material coating to be employed to form the three-dimensional transport structure.

The electrical machine has, for example, a rotor mounted on a hollow shaft, it being possible for the hollow shaft to form within its interior a closed hollow space in which a coolant is able to circulate between a warm and a cold end of the hollow shaft according to a thermosiphon effect. The electrical machine contains a stator which surrounds the rotor, said stator being located in particular inside a housing. The stator is thermally coupled to the housing. The housing has, for example, cooling-air ducts accessible at the end face for conveying the cooling airstream to cooling fins provided on the outside of the housing.

With electric motors, improved cooling of the rotor can result in an increase in efficiency. The cooling of the rotor can be achieved by means of a shaft thermosiphon in the rotor shaft. By cooling the shaft this also cools the rotor of the electric motor, which produces the desired increase in efficiency. The heat given off by the rotor is transported via the thermosiphon to a further cooling system, for example.

In addition to cooling of the housing and thus of the stator of an electrical machine, it is possible to support the rotor of the electrical machine on the hollow shaft in which the coolant circulates according to the thermosiphon effect. Due to such an embodiment of the rotor shaft, heat developing in the rotor in particular can be removed centrally via the shaft of the electrical machine. The removal of the heat from the electrical machine can therefore be realized via the stator as well as via the rotor.

According to one embodiment, in order to form the thermosiphon, a longitudinally-extending recess in which, due to a change in the aggregate state, the operating medium (coolant) can circulate between the liquid and the gaseous state, is provided in the shaft. In this connection, it is useful if the recess extends over the entire width of the rotor of the electric motor so that the best possible heat input can take place in the operating medium in the thermosiphon. Moreover, the recess can be formed in the region of the bearings of the electric motor. In addition to the cooling of the rotor, bearing temperatures at the bearings of the drive train are evened out and reduced, which increases the service life of these highly-loaded wearing parts.

A fan can be used in order to generate a cooling airstream which is directed onto the outside of a housing and at the same time cool one end of the hollow shaft of the machine so that the circulation of the coolant present in the hollow shaft can be maintained according to a thermosiphon effect.

In the case of an air-cooled drive, for example, the ambient air is directed along the finned drive housing with the aid of a fan. Consequently, the machine is cooled externally. Various paths can contribute to the removal of heat. On the one hand, heat losses in the stator can be directly transported by thermal conduction to the housing. Heat which is developed in the rotor is dissipated via radiation and convection in the air gap at the stator. The heat can be transported from there to the environment via the housing. In order to improve the removal of the waste heat of the rotor of the machine, it is possible by means of a thermosiphon system built into the shaft to transport the heat directly to the fan and from there to the air.

The electrical machine with a rotor mounted on a hollow shaft can be constructed so that the inside of the hollow shaft forms a closed hollow space in which the cryogen (coolant) is able to circulate between a warm and a cold end of the hollow shaft in accordance with the thermosiphon effect. The electrical machine has a stator enclosing the rotor, said stator being located inside a housing and thermally connected thereto. The machine has cooling ducts accessible at its end face to supply a cooling airstream to cooling fins provided on the outside of the housing. A fan impeller for conveying cold air into the cooling ducts and which is in thermal contact with the cold end of the hollow shaft is mounted at the end face of the rotor of the electrical machine and the cold end of the hollow shaft. The fan impeller is completely covered by a cowl, for example, which makes an airtight seal between the end face and the housing. The cowl has, for example, an axial inlet air opening, it being possible for the fan impeller to have heat transfer surfaces at its radial inboard areas, which project into the air inlet opening. An airstream which can be generated by means of the fan impeller is conveyed to the cooling fins provided on the outside of the housing. At the same time, the cold end of the hollow shaft can be cooled by the same fan, so that a thermosiphon effect can be maintained within the interior of the hollow shaft.

If the diameter of the thermosiphon is made smaller, this can lead to a pressure loss which can have a negative effect on the thermosiphon. In the case of a rotating thermosiphon, in particular with smaller diameters of the hollow space of the hollow shaft of the rotor of the electrical machine, means can be provided for conveying the condensate and/or the vapor of the coolant.

An electrical machine which has a stator and a rotor, it being possible for the rotor to have a hollow shaft, it being possible for the hollow shaft to be constructed, as least partially, with a closed hollow space, it being possible for the closed hollow space to be designed to accept a coolant, and for said electrical machine to have in the closed hollow space a three-dimensional transport structure for conveying the coolant. This enables the effectiveness of the cooling of a thermosiphon to be improved.

In one embodiment of the electrical machine, a filler is provided in the hollow space of the hollow shaft, it being possible for the filler to have a three-dimensional transport structure for conveying the coolant in an initial aggregate state. In this case the filler means does not completely fill the hollow space.

The cooling capacity can be actively improved by transporting the vapor and/or condensate. This transport can be ensured not only by a filler in the hollow space of the hollow shaft. The filler does not completely fill the hollow space of the hollow shaft, but leaves passages for the transport of the coolant. The filler can be designed for example as a twisted screw construction. Here the slope of this screw from one wall towards the center varies so that the outer part of the screw conveys the condensate from the condenser towards the evaporator and the inner part of the screw conveys the vapor towards the condenser. The manufacture of such constructions can be realized for example by means of a molding method and/or a milling method. Other manufacturing methods such as those known from rapid prototyping or "selective laser melting" can be employed.

The operating range of the thermosiphon, for example, can be increased with the three-dimensional transport structure. The operating range of a thermosiphon depends on the heat transfer coefficients in the evaporator and in the condenser, as well as transport processes. Transport processes are understood to mean the reverse transport of the condensate and the transport of the ensuing vapor. The transport of the condensate is effected by centrifugal forces. Furthermore, a conical condenser can improve transport. The transport of the vapor can also be influenced by a suction effect of the condensation process.

In one embodiment of the electrical machine, in addition to the first three-dimensional transport structure, the filler in the hollow space of the hollow shaft has a second three-dimensional transport structure for conveying the coolant in a second aggregate state.

In one embodiment of the electrical machine an inner wall of the hollow space of the hollow shaft has the first three-dimensional transport structure for conveying the coolant in a first aggregate state. Additionally, the inner wall can also have a second three-dimensional transport structure for conveying the coolant in a second aggregate state. The two aggregate states are liquid and gaseous (vapor). A separate filler introduced into the hollow space and attached at that location is therefore not absolutely necessary.

In one embodiment of the electrical machine the hollow shaft can therefore have a three-dimensional transport structure for transporting a condensate of the coolant, it being possible for this structure to constitute the first transport structure and for a filler introduced into the hollow space and attached at that location to contain the second transport structure for the second aggregate state. Here the first transport structure is provided to transport a condensate into the hollow shaft and the second transport structure is provided on the filler to transport vapor out of the hollow shaft.

The three-dimensional form of the transport structure enables transport functionality for the coolant when the rotor is rotating. The three-dimensional transport structure rotates along with the rotor of the electrical machine.

Vanes, a screw structure, a worm structure, are examples of a three-dimensional transport structure. Surface sections for the worm structure or screw structure can be of an interrupted or continuous construction.

In one embodiment of the electrical machine the three-dimensional transport structure has a number of vanes, it being possible in particular for a first number of vanes to have a first vane position and it being possible in particular for a second number of vanes to have a second vane position, it being possible for the first vane position to be provided to transport the coolant in a first aggregate state and it being possible for the second vane position to be provided to transport the coolant in a second aggregate state. Here the vanes in the first vane position constitute the first three-dimensional transport structure, for example, and the vanes in the second vane position constitute the second three-dimensional transport structure.

In one embodiment of the electrical machine the three-dimensional transport structure has a screw-type structure or a worm-type structure, it being possible in particular for a first screw-type structure or a worm-type structure to have a first coiling direction and it being possible in particular for a second screw-type structure or a worm-type structure to have a second coiling direction, it being possible for the first coiling direction to be provided to transport the coolant in a first aggregate state and it being possible for the second coiling direction to be provided to transport the coolant in a second aggregate state. The different three-dimensional transport structures therefore differ in the coiling direction. In one embodiment the two coiling directions have different pitches. In this case a filler can have both structures or even just one, it then being possible for the other structure to be located on the inner wall of the hollow space of the hollow shaft, for example.

Other examples of three-dimensional transport structures are microscale, nozzle-type grid structures which are arranged in a similar way to an open pore foam, for example, or spiral-shaped channels. Irrespective of the design of the three-dimensional structure, in each case at least one partial area of the structure is used to transport the fluid (fluid or gaseous) in a defined direction. For example, due to rotation about its longitudinal axis in a specified direction of rotation the filler is able to transport a fluid, such as a vapor for example, close to the axis of rotation in a specified direction along the axis of rotation and at the same time transport the same or another fluid (such as condensate for example) remote from the axis of rotation, in the opposite direction.

Due to rotation about its longitudinal axis in a specified direction of rotation, the filler which partially fills the hollow shaft causes the transport of a fluid (such as a vapor for example) close to the axis of rotation in a specified direction along the axis of rotation and at the same time causes the transport of the same or another fluid (such as condensate for example) remote from the axis of rotation, in the opposite direction.

The three-dimensional transport structure for transporting a coolant of a thermosiphon of an electrical machine can be produced by means of an additive material coating. For example, a beam-based powder bed process is employed.

Additive production processes allow a high degree of freedom in the design of components and three-dimensional structures, which cannot always be realized with conventional manufacturing methods. In these processes, components are produced, for example, in a metallic powder bed with an energetic beam as the tool (such as a laser or an electron beam). Here the beam is used to selectively melt thin powder layers. Advantageously, these production processes are based on the processing of CAD data which describe the three-dimensional objects by volume models or surface models. For processing in a production process these data are converted to layer data, it being possible for each layer to correspond to a cross-section of the component with a finite layer thickness. During production, this cross-sectional geometry is produced, for example, by linear light exposure of the external contours or area exposure of the cross-sectional area to be filled. Due to the punctiform characteristic of the beam, light exposure is realized by a corresponding movement of the beam. Area exposure is achieved for example by stringing together linear exposure processes.

With an additive manufacturing process, such as for example the one known as "Selective Laser Melting" (SLM), complex geometries in particular can be economically produced from metallic materials in small to large batch quantities. A filler which is produced by means of an additive process, in particular by beam-based powder bed processes such as selective laser melting (SLM) for example, can be exposed to high temperatures during the operation of the electrical machine.

The manufacture of the filler or the three-dimensional transport structure can also be realized with other materials, such as ceramic materials or plastics, for example. This can also be realized by processes which are not beam-based, for example 3D printing processes or by processes which do not need a powder bed, such as laser deposit welding for example.

The embodiment of a thermosiphon with the filler for the purpose of transporting condensate and vapor flow in opposite directions as described above, requires the manufacture of a three-dimensional transport structure which is chemically-resistant to the coolants employed.

Due to linear exposure patterns, for example, the beam-based and powder bed based additive production processes allow, in particular, the manufacture of thin-walled structures which as vanes can be a constituent part of the filler. However, such exposure patterns must not be based on existing 3D-CAD data. The use of adapted exposure patterns can therefore be necessary. The additive production process offers particular advantages in the design of thermosiphons with small hole diameters.

In the manufacture of a filler by means of selective laser melting (SLM), linear instead of area exposure patterns can be used for the manufacture of the thinnest wall thicknesses. For example, vane-type elements of the filler can therefore be used. Such structures must not stem directly from existing 3D-CAD design data, but can be produced by direct control of the laser beam over the powder bed.

BRIEF DESCRIPTION OF THE DRAWING

Further possible advantageous embodiments of the electrical machine follow from the examples explained in further detail below by way of drawings. Exemplifying embodiments of the inventive electrical machine are indicated in schematic representations in the drawings, of which.

DETAILED DESCRIPTION OF PREFERRED EMBODIMENTS

Figure 1:
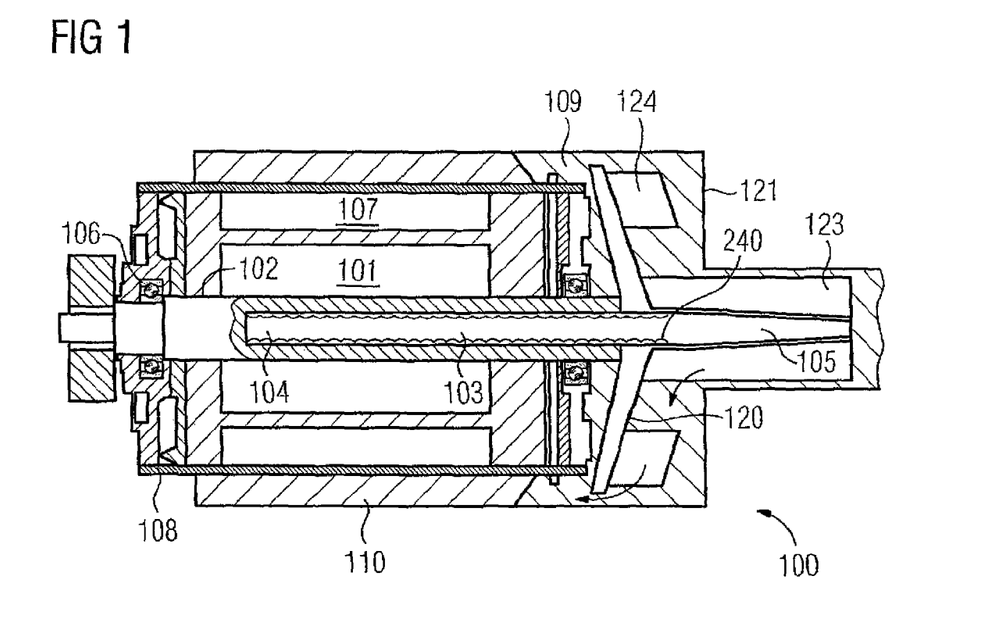
FIG. 1 shows a longitudinal section of a first electrical machine.

FIG. 1 shows an electrical machine 100 according to one exemplifying embodiment. The electrical machine 100 contains a rotor 101 which is retained on a hollow shaft 102. The hollow shaft 102 is supported by bearings 106 with respect to the housing 108 of the electrical machine. The interior of the hollow shaft 102 forms a hollow space 103 in which a coolant is able to circulate according to a thermosiphon effect. The hollow shaft 102 has a warm end 104 in the region of the rotor 101 and a cold end 105 in the region of a fan impeller 120. The rotor 101 of the electrical machine 100 is enclosed by a stator 107. The stator 107 is in turn retained in a housing 108 and is enclosed by the latter. On its outer side the housing 108 has cooling fins 110 thru which a cooling airstream flows via cooling channels 109 during operation.

A fan impeller 120 is located at the cold end 105 of the hollow shaft 102. The fan impeller 120 is completely covered by a cowl 121. The cowl 121 forms an airtight seal with the housing 108. The cowl 121 has an inlet opening in the axial region of the electrical machine 100.

The fan impeller 120 has fan blades 124 for generating a cooling airstream, as well as heat transfer surfaces 123. Cold air flowing thru the inlet opening 122 is directed onto the heat transfer surfaces 123 after entering the possibly nozzle-shaped neck region 125 of the cowl 121. The heat transfer surfaces 123 are in thermal contact with the cold end 105 of the hollow shaft 102. The cold air, possibly slightly heated up by the heat exchange, flows thru the cooling channels 109 to the cooling fins provided on the outer side of the housing 108 of the electrical machine 100. In this case the airstream is essentially driven by the fan blades 124. The inner wall of the hollow space 103 has a three-dimensional transport structure 240 the purpose of which is to transport condensate of the coolant.

Figure 2:
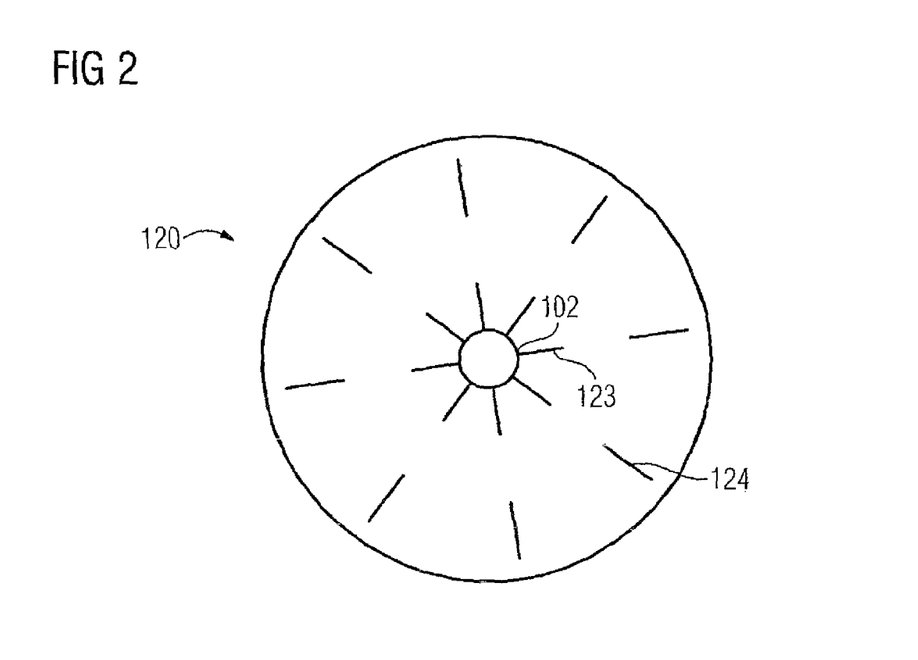
FIG. 2 shows a fan impeller for the electrical machine.

FIG. 2 shows a plan view of the fan impeller 120. The fan impeller 120 has heat transfer surfaces 123 in the inner, radial region in the vicinity of the hollow shaft 102. The fan impeller 120 has fan blades 124 in the radial, outer region. With reference to the fan blades 124 in particular, the fan impeller 120 is effectively a radial fan and can be constructed as such.

Figure 3:
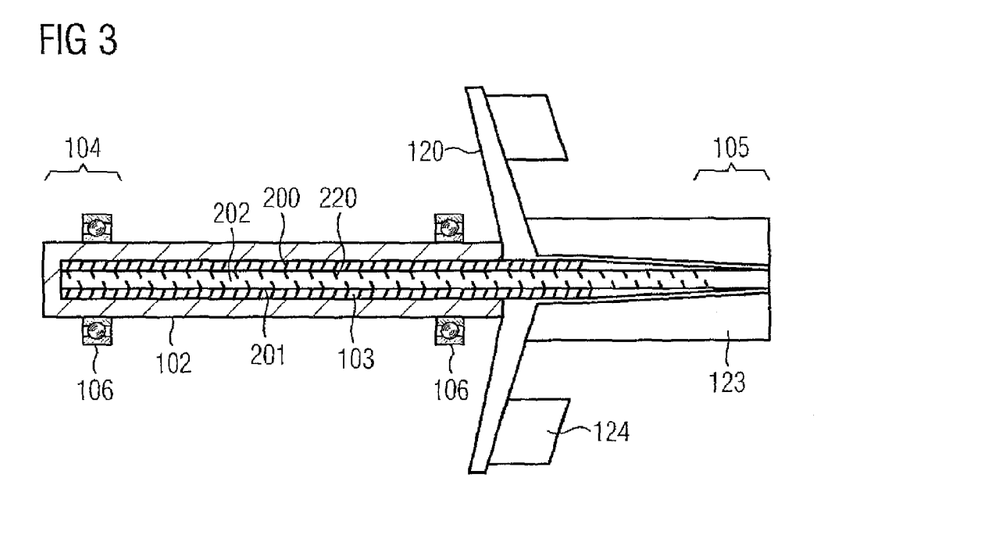
FIG. 3 shows a hollow shaft of an electrical machine.

According to a further exemplifying embodiment, FIG. 3 shows a hollow shaft 102 of an electrical machine 100. The hollow shaft 102 has a filler 201. In its interior the hollow shaft 102 has a hollow space 103, the filler 201, as well as an additional hollow space 202 enclosed by the filler 201. The hollow space 103 and the additional hollow space 202 are interconnected, for example, via holes in the filler 201, which are not shown in FIG. 3. The filler has a first three-dimensional transport structure 200 for transporting the coolant in a first aggregate state. The first aggregate state concerns a fluid, for example. The filler 201 also has a second three-dimensional transport structure 220 for transporting the coolant in a second aggregate state. The second aggregate state concerns a gas, for example.

An improvement in the operating range of the machine can be achieved by a rotating thermosiphon. Due to the filler 201 mounted in the rotating thermosiphon, the transport of fluid contained therein acts not solely due to the degree of taper of the bore and the centrifugal force on the condensate and the resulting suction effect on the vapor. Rather, the fluid is actively guided by the shaping of corresponding guide elements, that is to say of the three-dimensional structure, which are in particular a constituent part of the geometry of the filler.

Consequently, the transport of the fluid is particularly successful, even with rotating thermosiphons having a small bore diameter. The filler 201 has a first three-dimensional transport structure 200 for transporting condensate and a second three-dimensional transport structure 220 for transporting vapor, it being possible for the number of vanes to differ according to the transport fluid.

An improvement in the cooling function is realized by the use of the filler 201, even in the case of vertically-mounted rotor shafts. Active fluid transport occurs even if the condenser is underneath and the evaporator is placed on a higher plane.

Figure 4:
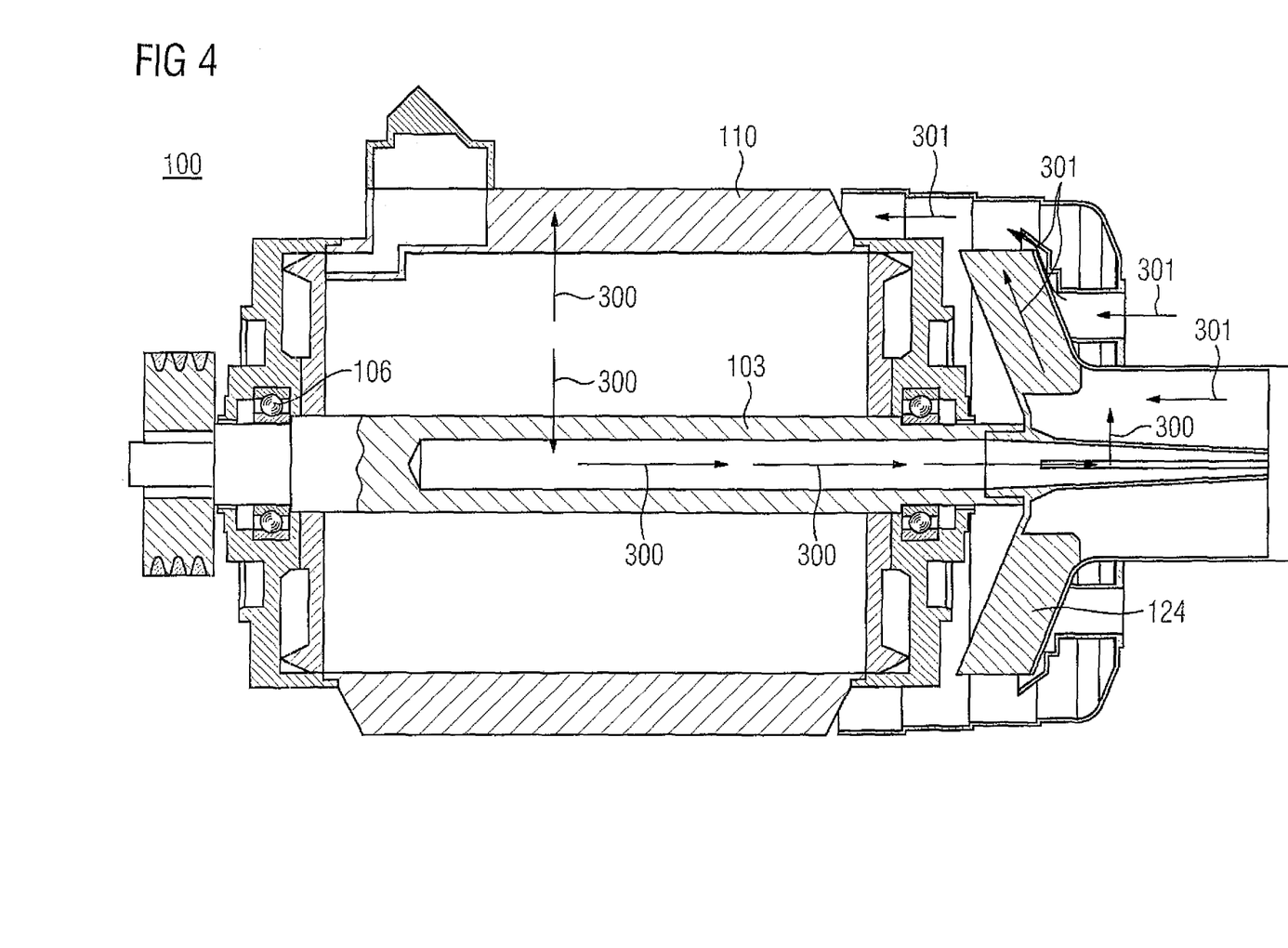
FIG. 4 shows a longitudinal section of a second electrical machine.

FIG. 4 shows a longitudinal section of an electrical machine 100, where heat flows are also represented. Heat energy to be removed is symbolized by arrows denoted by the reference number 300. Cooling air is symbolized by arrows denoted by the reference number 301.

Figure 5:
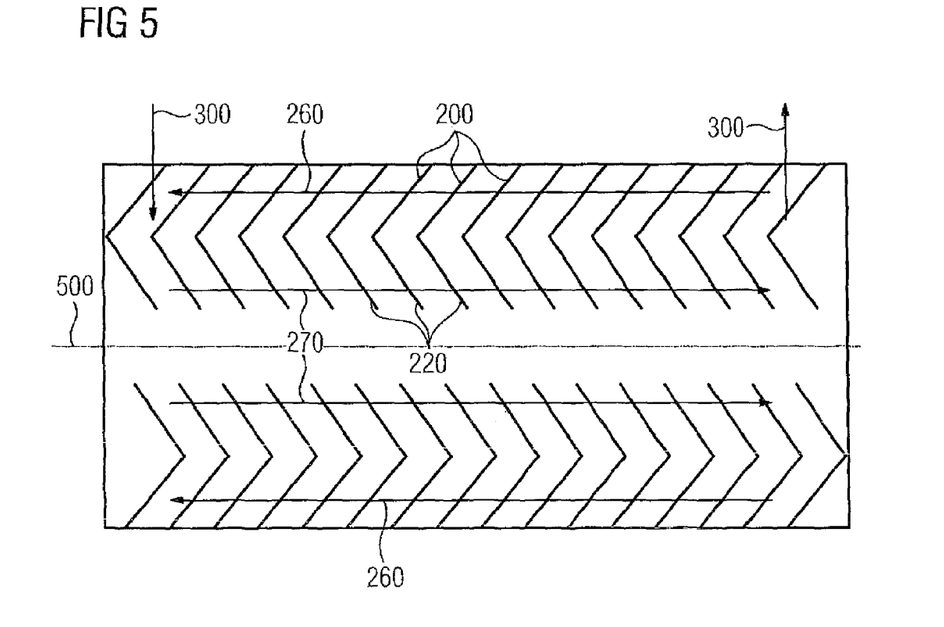
FIG. 5 shows a first three-dimensional transport structure.

The schematic representation in FIG. 5 shows a first three-dimensional transport structure 200 for transporting condensate 260 and a second three-dimensional transport structure 220 for transporting vapor 270, it being possible for symmetry about an axis 500 to result.

Figure 6:
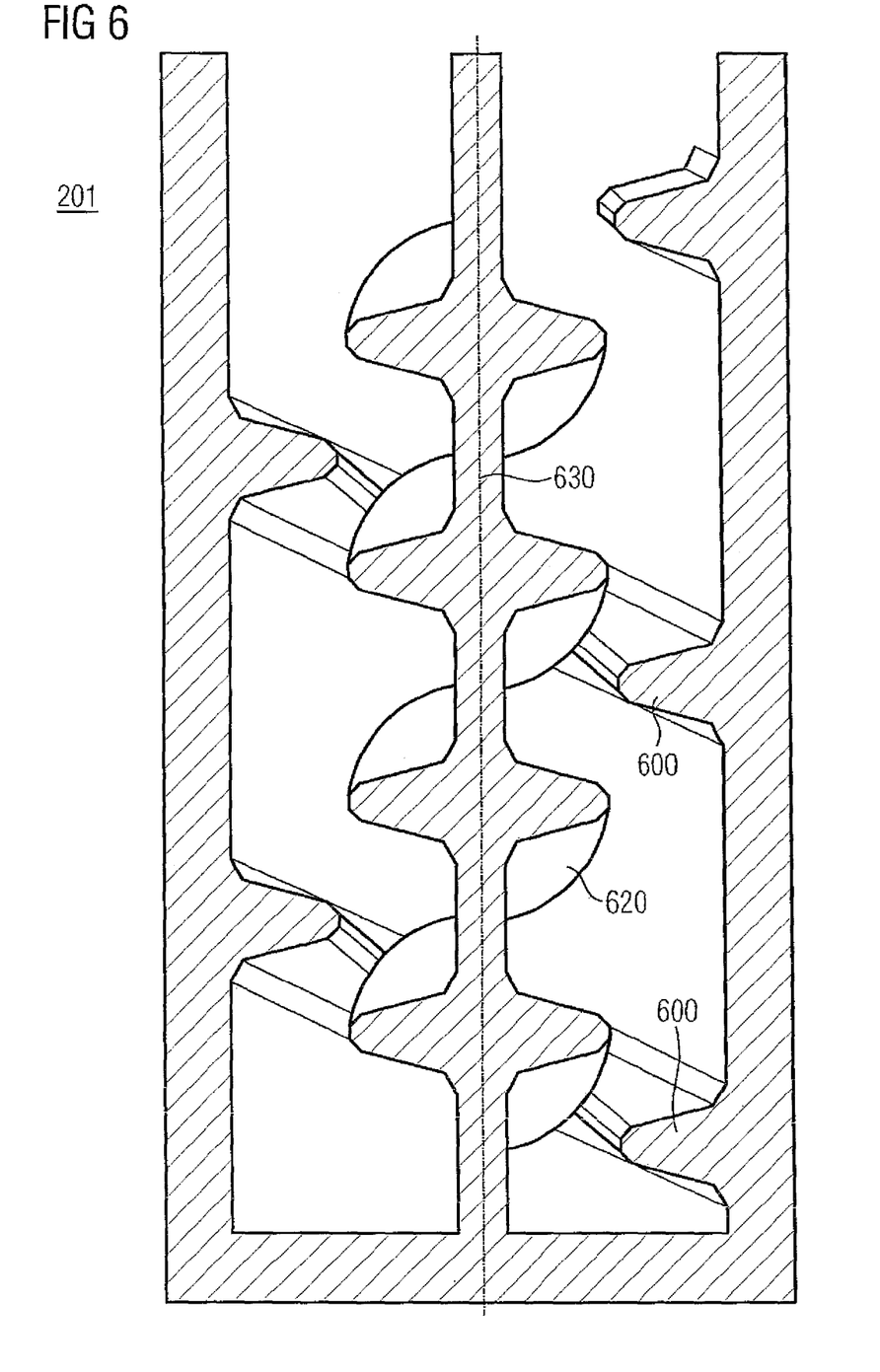
FIG. 6 shows a second three-dimensional transport structure.

The representation in FIG. 6 shows a thread-type first three-dimensional transport structure 600 and a helical second three-dimensional transport structure 620 around a core 630, which is a part of a filler 201 for the hollow space of the hollow shaft of the rotor of the electrical machine.

Figure 7:
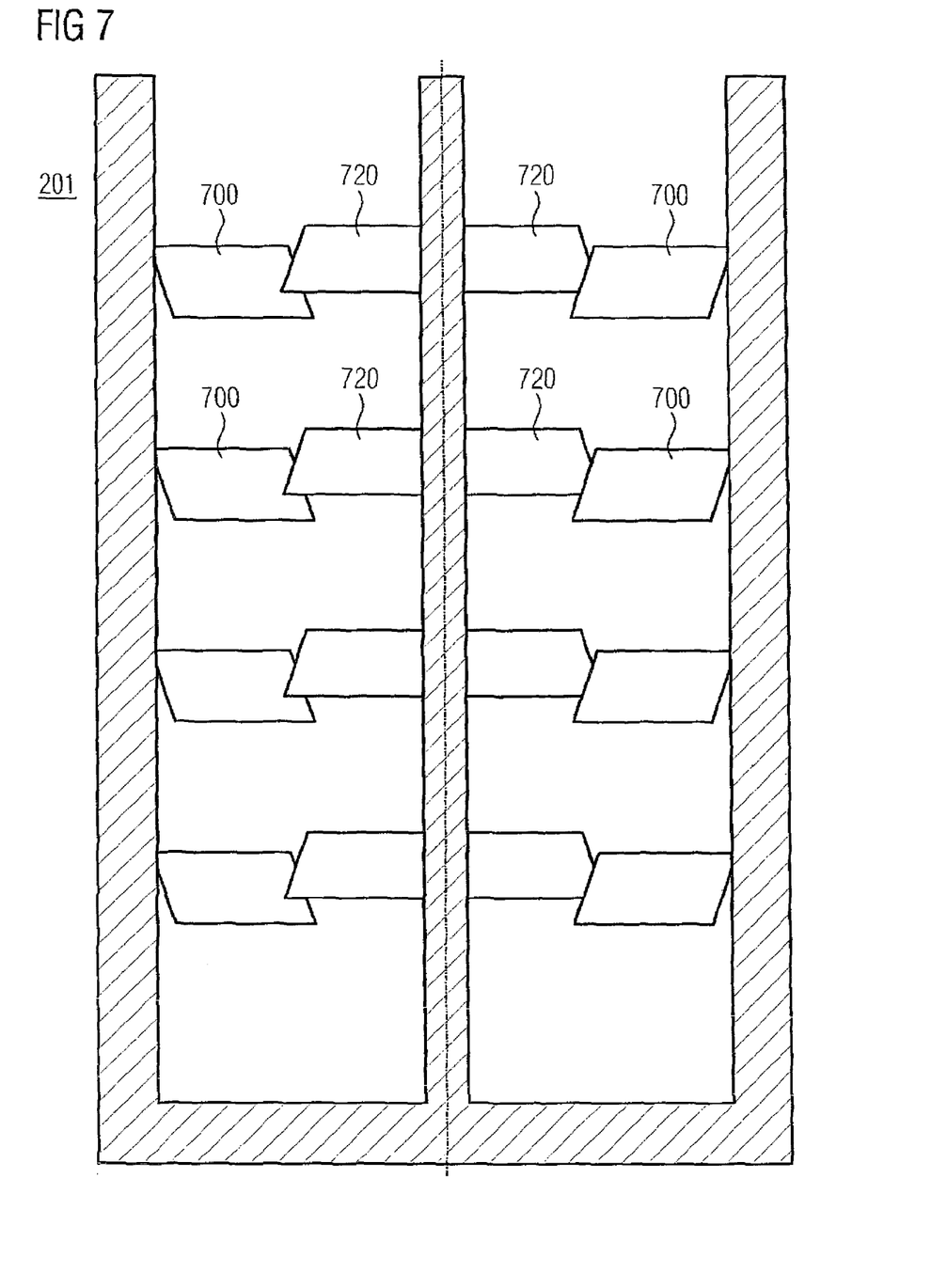
FIG. 7 shows a third three-dimensional transport structure.

The representation in FIG. 7 shows a filler 201 with vanes 700 with a first angle of attack as a first three-dimensional transport structure and vanes 720 with a second angle of attack as the second three-dimensional transport structure.

The invention claimed is:

1. An electrical machine, comprising:
a stator;
a rotor having a hollow shaft configured to have a closed hollow space to accept a fluid; and
two three-dimensional transport structures provided in the closed hollow space to transport the fluid and rotatable about a longitudinal axis of rotation, wherein said three-dimensional transport structures include a first three-dimensional transport structure and a second three-dimensional transport structure and constructed so that due to their rotation in a specified direction said first three-dimensional transport structure transports the fluid in a first aggregate state close to the axis of rotation in a specified direction along the axis of rotation and said second three-dimensional transport structure transports the fluid in a second aggregate state remote from the axis of rotation, in an opposite direction, wherein said first and second three-dimensional transport structures are located radially one inside the other and extend substantially over the same length in the axial direction, wherein the first three-dimensional transport structure and the second three-dimensional transport structure correspondingly have a first plurality of vanes assuming a first vane position to transport the fluid in the first aggregate state in the specified direction and a second plurality of vanes assuming a second vane position to transport the fluid in the second aggregate state in the opposite direction.

2. An electrical machine, comprising:
a stator;
a rotor having a hollow shaft configured to have a dosed hollow space to accept a fluid; and
two three-dimensional transport structures provided in the closed hollow space to transport the fluid and rotatable about a longitudinal axis of rotation, wherein said three-dimensional transport structures include a first three-dimensional transport structure and a second three-dimensional transport structure and constructed so that due to their rotation in a specified direction said first three-dimensional transport structure transports the fluid in a first aggregate state close to the axis of rotation in a specified direction along the axis of rotation and said second three-dimensional transport structure transports the fluid in a second aggregate state remote from the axis of rotation, in an opposite direction, wherein said first and second three-dimensional transport structures are located radially one inside the other and extend substantially over the same length in the axial direction, wherein the first three-dimensional transport structure and the second three-dimensional transport structure correspondingly have a first helical structure having a first coiling direction to transport the fluid in the first aggregate state in the specified direction and a second helical structure having a second coiling direction to transport the fluid in the second aggregate state in the opposite direction.

3. The electrical machine of claim 1, wherein each of the three-dimensional transport structures is a member selected from the group consisting of a microscale structure, a nozzle-type grating structure, an open pore foam structure, and a spiral-shaped channel structure.

4. A method for the manufacture of three-dimensional transport structures to transport a fluid of a thermosiphon of an electrical machine, comprising an additive material coating step to form the two three-dimensional transport structures including a first three-dimensional transport structure and a second three-dimensional transport structure rotatable about longitudinal axis of rotation and constructed so that due to their rotation in a specified direction of rotation said first three-dimensional transport structure transports the fluid in a first aggregate state close to the axis of rotation in a specified direction along the axis of rotation and said second three-dimensional transport structure transports the fluid in a second aggregate state remote from the axis of rotation, in an opposite direction, and wherein said first and second three-dimensional transport structures are located radially one inside the other and extend substantially over the same length in an axial direction, wherein the first three-dimensional transport structure and the second three-dimensional transport structure correspondingly have a first plurality of vanes assuming a first vane position to transport the fluid in a first aggregate state in the specified direction and a second plurality of vanes assuming a second vane position to transport the fluid in a second aggregate state in the opposite direction, or have a first helical structure having a first coiling direction to transport the fluid in the specified direction and a second helical structure having a second coiling direction to transport the same another fluid in the opposite direction.

5. The method of claim 4, wherein the material is a metallic material.

6. The method of claim 4, wherein the additive material coating step is executed by a beam-based powder bed process.

7. The method of claim 4, wherein the additive material coating step is executed by a selective laser melting to be employed.

8. The method of claim 4, wherein the additive material coating step is executed on a shaft of an electrical machine.

9. The method of claim 8, wherein the additive material coating step is executed in a hollow space of the shaft.

10. The method of claim 4, wherein the additive material coating step is executed on a body provided for introduction into a hollow shaft of an electrical machine.

11. The electrical machine of claim 1, further comprising a filler provided in the hollow space of the hollow shaft and including the first and second three-dimensional transport structures.

12. The electrical machine of claim 1, wherein the hollow shaft includes the first and second three-dimensional transport structures.

13. The electrical machine of claim 1, further comprising a filler provided in the hollow space of the hollow shaft, wherein the hollow shaft includes the first three-dimensional transport structure, and the filler includes the second three-dimensional transport structure.

14. The electrical machine of claim 2, wherein each of the first and second helical structures is a member selected from the group consisting of a screw-type structure and a worm-type structure.

15. The electrical machine of claim 2, wherein each of the three-dimensional transport structures is a member selected from the group consisting of a microscale structure, a nozzle-type grating structure, an open pore foam structure, and a spiral-shaped channel structure.

16. The electrical machine of claim 2, wherein the hollow shaft includes the first and second three-dimensional transport structures.

17. The electrical machine of claim 2, further comprising a filler provided in the hollow space of the hollow shaft, wherein the hollow shaft includes the first three-dimensional transport structure, and the filler includes the second three-dimensional transport structure.

* * * * *